United States Patent [19]

Efaw

[11] 3,962,555
[45] June 8, 1976

[54] TELEPHONE HANDSET GUARD

[76] Inventor: Dale E. Efaw, 21486 Lorain Road, Fairview Park, Ohio 44126

[22] Filed: Mar. 6, 1975

[21] Appl. No.: 556,091

[52] U.S. Cl. .............................................. 179/185
[51] Int. Cl.² ........................................ H04M 1/17
[58] Field of Search .......... 179/185, 184, 178, 179, 179/103

[56] References Cited
UNITED STATES PATENTS

| | | | |
|---|---|---|---|
| 1,400,334 | 12/1921 | Weinrich | 179/185 |
| 1,833,643 | 11/1931 | Gluck | 179/185 |
| 2,489,425 | 11/1949 | Levitt | 179/178 |
| 2,575,280 | 11/1951 | Long | 179/185 |
| 2,593,382 | 4/1952 | Zimmermann | 179/185 |
| 3,012,108 | 12/1961 | Bell | 179/187 |
| 3,243,527 | 3/1966 | Sternheim | 179/185 |
| 3,589,106 | 6/1971 | Onuki | 55/279 |

FOREIGN PATENTS OR APPLICATIONS 1,024,191   3/1953   France ............................. 179/185

Primary Examiner—Thomas W. Brown
Attorney, Agent, or Firm—Ronald R. Stanley

[57] ABSTRACT

A guard for a dial-in-handset telephone is disclosed which covers both the mouthpiece and the receiver as well as a portion of the handle. The guard prevents the spread of germs both to and from the receiver and mouthpiece of the telephone. Additionally, the guard is capable to some extent of preventing dirt, grease or other undesirable substances from being transferred either to or from the handset of a telephone. The guard is further useful for advertising and/or decorative purposes.

5 Claims, 7 Drawing Figures

TELEPHONE HANDSET GUARD

BACKGROUND OF THE INVENTION

1. Field of the Invention

In this day and age, when the telephone plays an extremely important part in practically everything that is taking place, more effort should be directed at stopping diseases which may be spread through contact with a telephone.

Public telephones, in particular, are handled by a multitude of people each and every day. In the event that just one of this multitude of persons were sick, every subsequent user is subject to infection by whatever germs might be able to sustain themselves until being passed on.

Other than germs, telephones which are handled by large numbers of people may from time to time accumulate other undesirable substances thereon, e.g., grease.

In these respects, although it may not be feasible or probable to eliminate these accumulations at their inception, precautions may be taken by any particular user to resist the spreading of them.

2. Prior Art

A number of attempts have been made to provide a solution to the problems stated above, but all have apparently failed for one reason or another. Surely, the lack of these items on the market in use evidences insufficiency of public acceptance.

One such prior device is shown by U.S. Pat. No. 1,833,643. This patent expressly discloses a protector for only the mouthpiece of a telephone. The protector includes a disinfectant material 18 and an elaborate mechanism for causing the disinfectant to be released onto the mouthpiece.

U.S. Pat. No. 3,238,313 discloses another protector for telephone mouthpieces. While one of the stated objects of the patent is low cost manufacturing of the item, the description includes a complicated construction of a filter 13 for the protector at column 1, line 61 through column 2, line 18.

Two other U.S. Pat, Nos. 3,001,033 and 3,148,249 disclose covers for the mouthpieces only of telephones. The latter of these two patents has as a primary object the interception of particles or germs ejected from the mouth of a user of the telephone. As noted above, incentives to take initial preventive measures is very often lacking. The instant problem is more realistically approached by assuming the presence of particles and/or germs and taking steps to prevent the spreading thereof.

Finally, U.S. Pat. No. 3,169,171 does disclose, if only impliedly, the use of protective covers on both the receivers and transmitter (i.e., mouthpiece) of telephones. However, the suggested solution involves placing identical, wholely independent, caps over each of the receiver and transmitter of a phone. This is surely inconvenient and also possibly uneconomical.

SUMMARY OF THE INVENTION

The primary object of this invention is to provide a new and improved guard for telephone handsets.

Further objects of this invention are to provide a new and improved guard for telephone handsets which restricts the spread of germs to users of the telephone, which restricts transfer of dirt and/or grease to and from the telephone, which is useful in a decorative manner, and which is useful as an advertising means.

Other objects of this invention are to provide a new and improved guard for telephone handsets which is extremely economical to produce, which is not exceedingly complicated to use, which is compact and portable, and which may be easily carried by a user to be installed when desired.

Still further objects of this invention are to provide a new and improved guard for telephone handsets which covers both the receiver and transmitter, which covers a portion of the handle of the handset and which is a one piece unit, Yet another object of this invention is to provide a new and improved guard for telephone handsets which includes a removable, replaceable germ retarding material at the face of both the receiver and the transmitter.

A further object of this invention is to provide a new and improved guard for telephone handsets which obtains one or more of the objects and advantages set forth above.

These and other objects and advantages of this invention will become apparent from the following description thereof, in view of the accompanying drawings.

DETAILED DESCRIPTION OF THE PREFERRED EMBODIMENT

The present invention concerns a one piece, disposable telephone handset guard which covers both the receiver and transmitter of the handset and also a portion of the handle of the handset. The guard is flexible and compact enough to be capable of folding or otherwise manipulating in order to be carried on or with a person without causing inconvenience.

Figure 1:
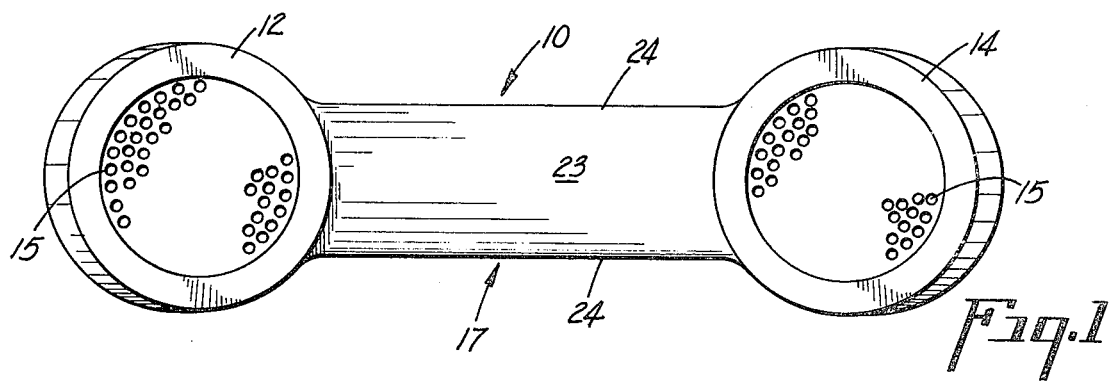
FIG. 1 is a plan view of a handset of a conventional telephone handset including thereon the a guard.

FIG. 1 illustrates a telephone guard indicated generally at 10 as intended by this invention in position on what may be considered a conventional telephone handset. The guard 10 is constructed of any suitably flexible material, e.g., sheet vinyl, polyethylene, etc. The guard includes a first cap 12 covering the receiver, i.e., earpiece, and a second cap 14 covering the transmitter, i.e., mouthpiece of the telephone handset.

Both the first 12 and second 14 caps include on the face thereof a perforated surface 15 which may be constructed by providing holes therethough, or any other suitable method. The perforated surface 15 is of course provided so that sound may be emitted through the guard 10 from and to the telephone handset.

The first 12 and second 14 caps are integrally connected by a portion indicated at 17 of the same material as is the remainder of the guard 10. With the assistance of FIG. 2 the construction of the guard 10 is more easily understood.

The guard 10 as noted above is installed on a telephone handset, indicated generally at 19, having a receiver 20 and a transmitter 21. The first cap 12 is formed in a manner to conform to the shape of the receiver 20. The second cap 14, is likewise formed to conform to the shape of the transmitter 21. Each of the first 12 and second 14 caps, as will be described more thoroughly at a subsequent portion thereof, has means for restricting the passage of germs to and/or from the relevant portion of the telephone handset.

A portion 17 of the guard 10 which covers the handle of the handset may include a top portion 23 generally in the same plane as the receiver 20 and transmitter 21, side walls 24 integral therewith and bottom flanges 25, also integral therewith. The bottom flanges 25 wrap around the handle of the telephone 19, as shown by FIG. 2a, and operate to fasten the guard 10 to the telephone. The extent to which the bottom flanges 25 wrap around the handle is not critical. The purpose of the flanges 25 is to hold the guard 10 onto the telephone 19. For this reason, the length of the flanges 25 may vary anywhere from just slightly overlapping the handle to practically touching one another.

In the event that the flanges 25 overlap the handle to a great degree, sufficient support for the guard 10 is obtained so that the first 12 and second 14 caps may be relatively loose fitting. If, however, the flanges 25 overlap only to a small degree, the first 12 and second 14 caps may be desired to be relatively tight fitting to the receiver 20 and transmitter 21, respectively, in order to assist in supporting the guard 10 on the telephone handset 19.

Figure 2:
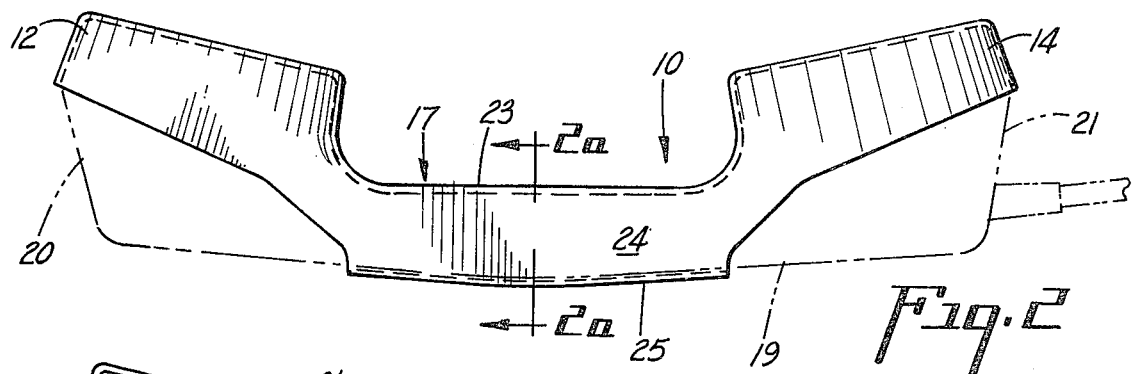
FIG. 2 is a side elevation of a handset of a conventional telephone including the guard.
Figure 2A:
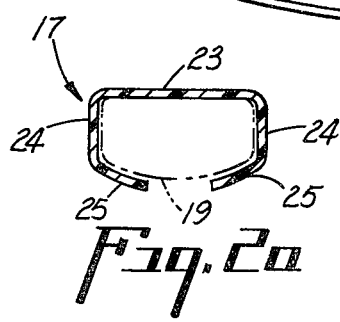
FIG. 2a is a partial cross sectional view of a telephone handset and guard taken along line 2a—2a of FIG. 2.

When utilizing the guard on a conventional telephone, as illustrated in FIGS. 1 and 2, the top portion 23 of the guard 10 may be used for advertising. In this regard, factual or pictorial information may be permanently provided on the top portion 23 by means of printing or any other suitable means. For this reason, the guard 10 may easily be seen to be useful as an advertising aid and thus be given away by merchants and other entrepreneurs.

Figure 3:
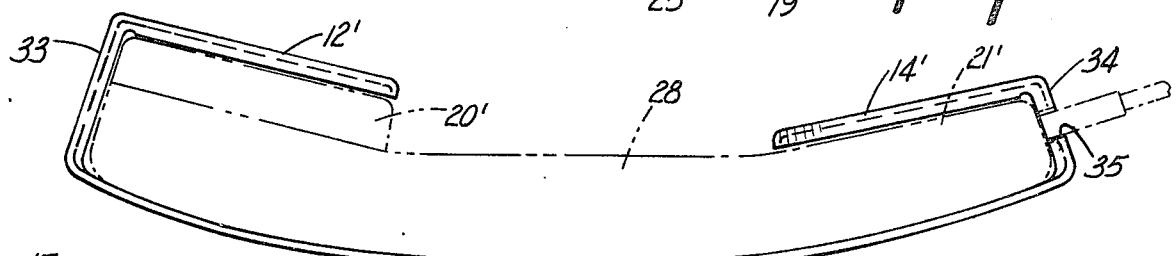
FIG. 3 is a side elevation of a handset of a Trimline (dial-in-handset) telephone including the guard of this invention.

FIG. 3 illustrates a variation of a telephone guard indicated at 10', specifically designed for use with what has come to be known as a Trimline telephone, a handset of which is indicated at 28.

This type of telephone handset has a receiver 20' at one end and a transmitter 21' at the other end as before. However, integral with the handset 28 and intermediate the receiver 20' and transmitter 21' is a dial mechanism (not shown in the figures). For this reason, the guard 10' may not include a portion covering the area between the receiver 20' and transmitter 21'.

Figure 4:
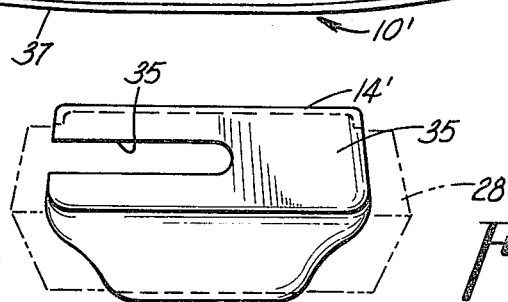
FIG. 4 is an end view of the telephone handset and guard as shown in FIG. 3.

In this case, the guard 10' is constructed in a manner similar to a rubber over-shoe. A first side portion 33 of the guard 10' extends down the short side of the telephone handset 28 nearest the receiver. A second side portion 34 extends down the short side of the handset 28 nearest the transmitter. This second side portion 34 has integrally designed therein an aperture 35 through which a cord attaches the handset 28 to the remainder of the telephone. FIG. 4 illustrates, in more detail the second side portion 34 and the aperture 35. Although the aperture 35 is shown in a manner requiring the guard 10' to be installed by sliding on from one side, any other suitable design may be employed.

The first 33 and second 34 side portions of the guard 10' are connected by a bottom portion 37 which extends over the back of the handset 28. The bottom portion 37 may be of any desirable width. Since, as noted above, the guard 10' is intended to be slid onto the handset 28 the portion 37 should not extend further than the width of the handset 28 particularly in an upwards direction. As in the case of the top portion 23 on the guard 10, the bottom portion 37 is intended to be utilized for advertising.

Although the first cap 12 of the guard 10 for conventional telephone handsets is hereafter utilized to described in detail the means for restricting the passage of germs to and/or from the handset, it should be understood that either the first 12 (12') or second 14 (14') cap on the guard 10 (10') is extremely similar in structure and function.

Figure 5A:
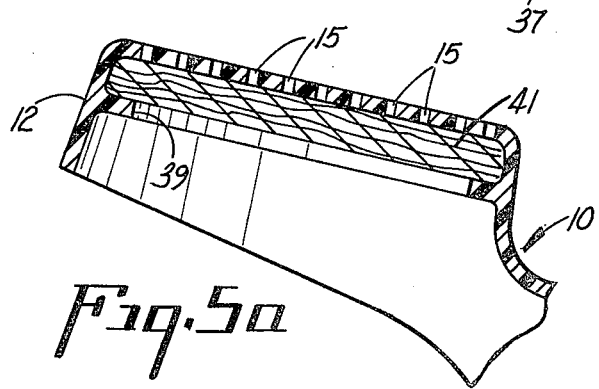
FIG. 5a is a partial cross sectional view of a portion of the guard illustrating one means of inserting germ retarding material.

FIG. 5a illustrates one method of including a germ restricting means in the cap 12. As noted above, the face of the cap 12 is perforated, indicated at 15, in order that sound may travel through the cap. In this case, a flange 39 is provided which is integral with the cap 12 and extends around all or a portion of the circumference of the cap.

A sterile gauze material 41 is positioned against the perforated surface 15 of the cap 12 and restrained there by insertion between the flange 39 and the perforated surface 15. Although sterile guaze material is stated above, any suitable germ restricting media can be utilized.

Figure 5B:
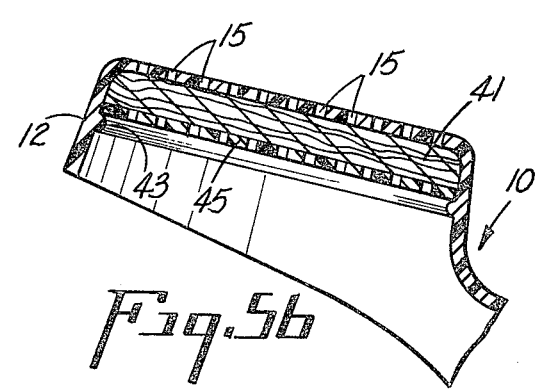
FIG. 5b is a partial cross sectional view of a portion of the guard illustrating another means of inserting a germ retarding material.

FIG. 5b illustrates another method of including the germ restricting means in the cap 12. In this case, a ridge 43 is constructed integrally with the inside of the cap 12. The ridge 43 is only minimal in height from the cap 12 and extends around the entire circumference thereof. The sterile gauze material 41, as before, is placed with in the cap 12 and immediately adjacent to the perforated surface 15.

A perforated disc 45 is positioned immediately adjacent the sterile gauze material 41. The perforated disc 45 is preferably of a diameter just slightly larger than the diameter of the ridge 43 in the cap. In this manner, when the disc 45 is forced beneath the ridge 43, the sterile guaze 41 is restrained thereby.

Whether the caps 12 and 14 (12' and 14') are designed as shown in either FIG. 5a or 5b, or designed in any other suitable fashion, once the guard 10 (10') is installed onto the telephone handset 19 (28) the sterile gauze 41 is in position to restrict the spread of germs. In either case, the receiver and transmitter is in contact with either the flange 39 or the ridge 43 when the guard is in place.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

What I claim is:

1. An apparatus for covering at least a portion of a handset of a telephone having a receiver, a transmitter, a handle and a dial mechanism intermediate the receiver and transmitter, comprising first cap means for covering the receiver of the handset, second cap means for covering the transmitter of the handset, filter means for each of said first and second cap means, and connecting means integrally connecting the first and second cap means covering a substantial portion of the handset specifically excluding the dial mechanism, and said connecting means including a slot for entry of an electrical connection to said handset.

2. The apparatus according to claim 1 in which the connecting means operates to maintain the position of the apparatus.

3. The apparatus according to claim 1 in which the first and second cap means and connecting means are constructed of a flexible plastic material.

4. The apparatus according to claim 1 in which the filter means includes a germ retarding means.

5. The apparatus according to claim 1 in which the first and second cap means are perforated whereby sound may easily pass therethough.

* * * * *